United States Patent Office 3,716,609
Patented Feb. 13, 1973

3,716,609
PROCESS FOR PREPARING MOLDED STRUCTURE FROM POLYPHENYLENE SULFIDE RESIN AND FILLER
John C. Trocciola, Glastonbury, Warren L. Luoma, Wethersfield, Richard C. Nickols, Jr., South Windsor, and Roger C. Emanuelson, Glastonbury, Conn., assignors to United Aircraft Corporation, East Hartford, Conn.
Filed Oct. 5, 1970, Ser. No. 77,928
Int. Cl. B22f 3/14; B29c 25/00; C08g 25/00
U.S. Cl. 264—111                                    5 Claims

ABSTRACT OF THE DISCLOSURE

A novel molded structure of polyphenylene sulfide resin and a filler is produced according to a process wherein the resin/filler mixture is precured by heating the mixture to a temperature below the melting temperature of the resin prior to molding; the mold is preheated to a temperature of about 600 to 700° F. and the charge of resin/filler mixture is preheated to a temperature below the melting temperature of the resin; the molding pressure of about 3000 p.s.i. is applied to the mold before the resin has time to encapsulate the filler; after cooling the mold while maintaining the pressure, the molded structure is removed from the mold.

BACKGROUND OF THE INVENTION

Field of the invention

This invention relates to a molded structure, and particularly to molded fuel cell coolant plates in which polyphenylene sulfide resin is utilized as a binder.

Description of the prior art

Polyphenylene sulfide resin has been blended with filler materials such as graphite, carbon, silver, copper, iron and magnesium. However, in known methods of combining the polyphenylene sulfide resin with the filler material, a precuring step is performed after mixing the resin and filler at a temperature above the melting temperature of the resin. When so precured, the resin tends to encapsulate the filler; the encapsulation has a detrimental effect on the electrical and thermal characteristics of the composition. That is, the electrical resistivity is relatively high and the thermal conductivity is relatively low, both properties being undesirable when the composition is used, for example, as a fuel cell coolant plate or the like where it is desired that the plate has a high rate of thermal conductivity and low electrical resistivity.

It is also known that polyphenylene sulfide resin/filler mixtures can be molded into desirable shapes by conventional molding techniques. However, we have discovered a molding process by which the electrical conductivity and thermal conductivity of the molded structure are significantly increased over molded structures made according to known processes.

SUMMARY OF THE INVENTION

The object of the present invention is to provide a process for molding a structure of polyphenylene sulfide resin and a filler and the article produced thereby by which the molded structure acquires superior thermal and electrical conductivity compared to structures made by known processes.

The above and other objects and advantages are obtained by a process in which polyphenylene sulfide resin is mixed with a filler (the resin powder comprising 10 to 40 percent of the mixture by weight), either before or after precuring the resin, the essential feature of the process being that the resin is heated to a temperature below its melting point during precure so that the resin does not encapsulate the filler. Further in this regard, during the molding process, it is desirable to preheat the mold to a temperature of 600° to 700° F. After the charge of resin-filler has been loaded into the mold, it is necessary to apply the molding pressure (of about 3000 p.s.i.) before the resin has time to encapsulate the filler and case. Encapsulation of the filler prevents good filler to filler contact and results in poor electrical and thermal conductivity of the molded structure.

In further accord with the present invention it has been found that preheating the resin-filler mixture to a temperature below the melting temperature of the polyphenylene sulfide resin before loading the mixture into the preheated mold produces a molded structure, the electrical resistivity of which is only about 60 percent as great as the electrical resistivity of a mixture preheated to a temperature above the melting point of the resin.

Our novel process for making a molded polyphenylene sulfide resin-filler structure with greatly increased thermal and electrical conductivity can, for example, be accomplished according to the following:

Blend polyphenylene sulfide resin particles with filler particles in the proportions of about 60 to 90 percent by weight of filler and 10 to 40 percent by weight of resin. A preferred composition has been found to be 85 weight percent graphite powder and 15 weight percent resin powder. Precure the resin (either before or after it is blended with the filler) by heating it to a temperature below its melting temperature, which is about 550° F.; baking at about 500° F. for about 12 hours in a circulating air oven has produced very satisfactory results. Place preheated (to about 500° F.) resin-filler mixture into a preheated (600–700° F.) mold and apply a load of about 3000 p.s.i. and maintain the mold at a temperature above 550° F. for about five minutes; it should be noted that the molding pressure should be applied before the resin-filler mixture heats up to a temperature above the melting point of the resin in the preheated mold so that the resin does not encapsulate the graphite.

The mold and contents are then cooled to about 400° F., and it is preferable to maintain full pressure during cooling. The molded structure may then be removed from the mold.

The foregoing and other objects, features and advantages of the present invention will become more apparent in light of the following detailed description of a preferred embodiment thereof.

DESCRIPTION OF THE PREFERRED EMBODIMENT

A molded structure, which may be, for example, a cooling plate for use in fuel cells, may be made of polyphenylene sulfide resin and a filler such as nickel, graphite, magnesium, aluminum, copper, tantalum, iron, titanium, silver or other suitable materials.

Figure 1:
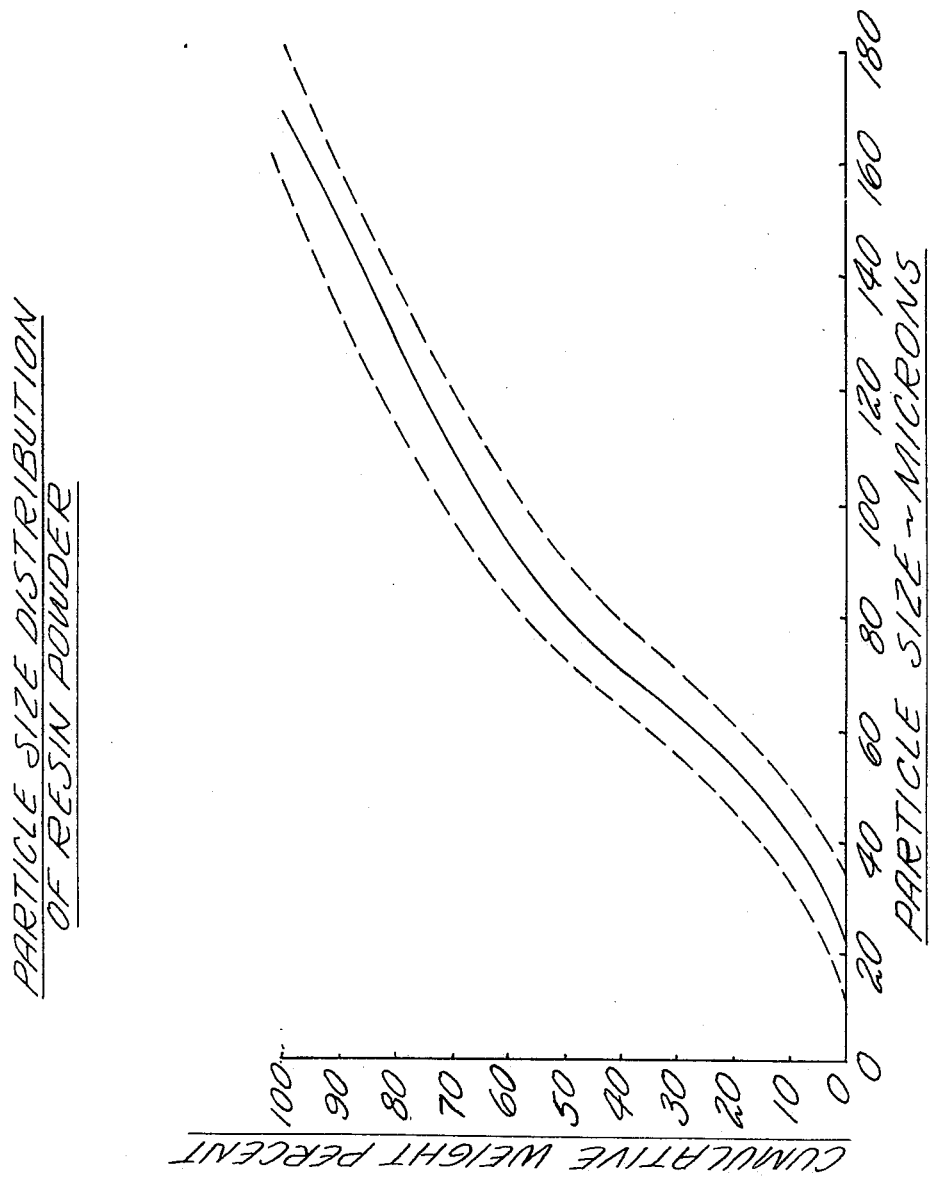
FIG. 1 is a graphical illustration of the particle size distribution of the polyphenylene sulfide resin powder.

Polyphenylene sulfide resin is thermosetting in nature, but is not a true thermoset. This characteristic enables the resin-filler composition to be compression or injection molded, for example, like a thermoplastic, while still maintaining the high thermal stability of a thermoset. The resin is a free flowing powder with a particle size of 25 to 170 microns. The particle size distribution of the resin is shown in FIG. 1. The resin has a melting point of about 550° F.; it tends to harden to the temperature at which it is cured, but does not reach an infusible state.

Figure 2:
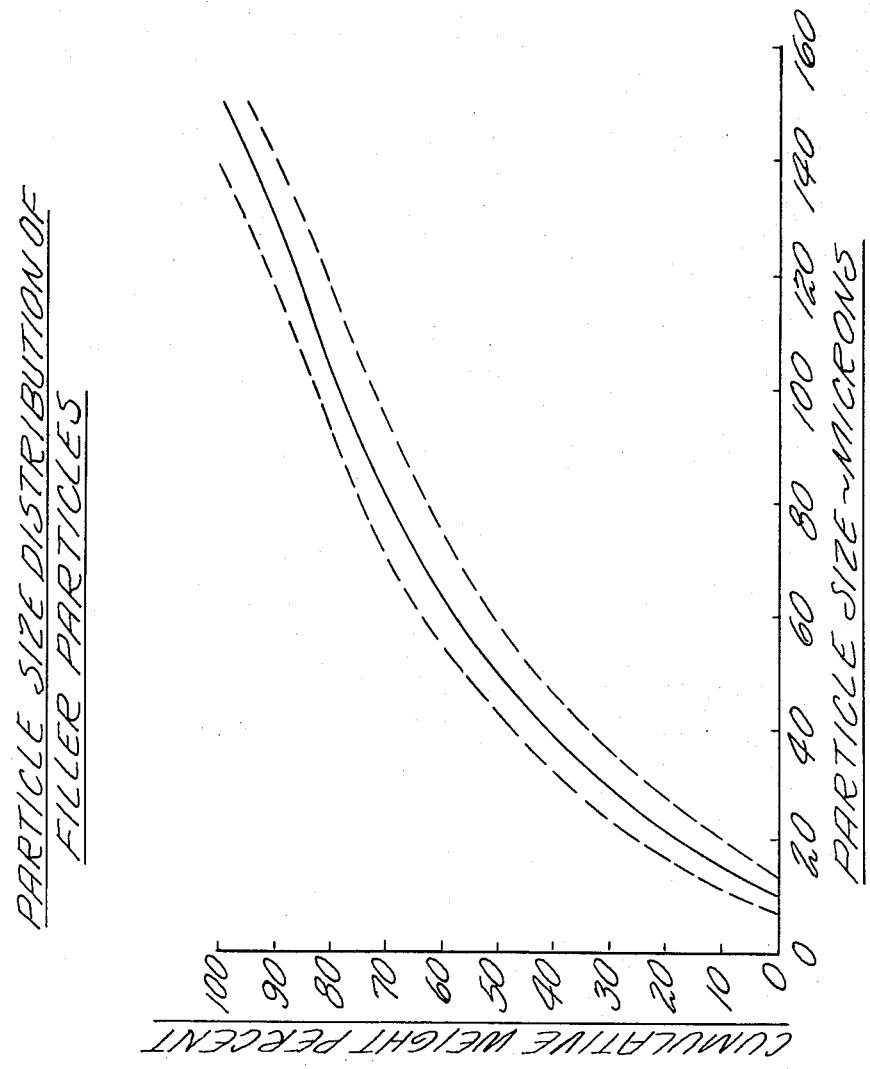
FIG. 2 is a graphical illustration of the particle size distribution of the filler powder.

The particle size of the filler is important in order to get improved thermal and electrical conductivity. We have found that the particle size of the filler which gives optimum results is 10 to 150 microns. The particle size distribution of filler is shown in FIG. 2.

The polyphenylene sulfide resin must be precured below its melting temperature prior to molding in order to achieve a homogenous structure and a structure which has the greatly improved thermal and electrical conductivity of our molded structure. The resin powder and the filler powder can be blended before or after precuring of the resin since the resin is precured below its melting temperature. In other words, when the resin is precured below its melting temperature, there is no possibility that it can encapsulate the filler particles, even if the resin is pre-cured after it is blended with the filler particles. The encapsulation of the filler would result in poor thermal and electrical conductivity as will be shown hereinafter.

After the resin and filler have been blended and the resin precured, (not necessarily in that order), the actual molding process might take place as follows to obtain a high density, highly conductive structure: A mold is preheated to about 600 to 700° F. The precured resin-filler mixture is preheated to a temperature below the melting point of the resin (500° F., for example, produces excellent results). The reason for preheating the precured resin-filler mixture is to decrease heatup time of the mixture in the mold and to decrease the heat loss from the mold. Once again it is essential that the mixture not be preheated to the melt temperature of the resin because the filler particles would be encapsulated by the resin, which has a very high wetting ability and would inhibit good filler particle to particle contact, which would result in poor electrical and thermal conductivity.

The mold is then loaded with the desired charge of preheated resin-filler mixture, and a load of about 3,000 p.s.i. is quickly applied to the mold; the load should be applied before the resin has time to heat up to its melt temperature so that encapsulation of the filler particles does not occur. While maintaining full pressure the mold is maintained above 550° F. (the melt temperature of the resin) for about five minutes until proper curing of the resin occurs. The mold is then cooled to about 500° to 400° F. while maintaining full pressure. After so cooling, the structure may be removed from the mold.

The importance of preheating the precured resin-filler mixture before molding is shown in Table I below, which compares preheating the mixture to a temperature below the melting point of the resin with preheating the mixture to a temperature above the melting point of the resin. The composition used in this test was 85 weight percent graphite and 15 weight percent resin.

TABLE I

| Test number | Temperature before pressing, ° F. | | Molding pressure, p.s.i. | Density, gm./cm.³ | Electrical resistivity, ohm-cm. |
|---|---|---|---|---|---|
| | Mold | Resin-filler mixture | | | |
| 1 | 650 | 650 | 3,000 | 1.91 | 23×10⁻³ |
| 2 | 650 | 425 | 3,000 | 1.98 | 16×10⁻³ |

As seen in the above table, the electrical resistivity is about 50 percent greater if the powder is preheated to above the melting temperature of the resin (Test No. 1). This demonstrates that the resin has encapsulated the graphite particles.

The physical and structural properties demonstrated by an 85 weight percent graphite and 15 weight percent polyphenylene sulfide structure molded in accordance with our invention are shown in Table II.

TABLE II

| Property: | Bulk | Direction parallel to pressing |
|---|---|---|
| Density | 1.95 gm./cm.³ | |
| Electrical resistivity (70° F.) | | 11×10⁻³ ohm-cm. |
| Thermal conductivity (200° F.) | | 13.5 B.t.u./hr. ft.° F. |
| Compressive creep (1,500 p.s.i. at 300° F.) | | <1%. |
| Compressive strength (70° F.) | | 14,600 p.s.i. |
| Compressive strength (300° F.) | | 11,400 p.s.i. |
| Corrosion resistance: | | |
| 37.5 w/o KOH, 12.5 w/o K₂CO₃ (1,000 hrs. at 200° F.) | 0.01% wt. gain | |
| 96 w/o H₃PO₄ (100 hrs. at 300° F.) | 0.31% wt. gain | |
| H₂O autoclave (500 hrs. at 300° F.) | 0.5% wt. gain | |

Table II demonstrates that the properties of the molded graphite-polyphenylene sulfide resin structures are eminently suitable for both acid and base electrolyte fuel cell applications.

To obtain a measure of the molding characteristics of the polyphenylene sulfide resin and filler mixture, molding trials were conducted to compare the flow properties of an 85 weight percent graphite/15 weight percent polyphenylene sulfide resin composition and an 85 weight percent graphite/15 weight percent Resinox composition. Resinox is a phenolic resin which has been used heretofore in molded structures. Cold pressed two inch diameter discs of the compositions were placed in a six inch by six inch mold and then compressed. A relative measure of flow was obtained by comparing the areas of the discs after pressing under a 3000 p.s.i. load. The graphite/polyphenylene sulfide resin composition flowed to a 70 percent greater area than the graphite/Resinox composition.

There has thus been described a preferred embodiment of a process for molding a polyphenylene sulfide resin/filler composition in accordance with our invention. It should be understood by those skilled in the art that various changes and omissions in the form and detail thereof may be made therein without departing from the spirit and scope of the invention.

What we claim as novel and desire to secure by Letters Patent of the United States is:

1. A process for molding a fuel cell plate having improved thermal conductivity and electrical conductivity comprising:
  mixing polyphenylene sulfide resin powder having a particle size of 25 to 170 microns with at least one filler powder selected from the group consisting of nickel, graphite, carbon, magnesium, aluminum, copper, tantalum, iron, titanium and silver having a particle size of 10 to 150 microns, said resin powder comprising 10 to 40 percent of the mixture by weight;
  precuring said polyphenylene sulfide resin by heating it to a temperature below its melting temperature before or after mixing with said filler powder and holding at temperature for a sufficient period of time to provide a substantially uniform temperature distribution throughout said resin;
  preheating a mold to a temperature of 600° to 700° F.;
  loading said mold with a charge of resin/filler mixture which has been preheated to a temperature below the melting temperature of said resin;
  applying a load of about 3000 p.s.i. to said mold before said resin-filler mixture heats up to a temperature above the melting point of the resin in the preheated mold, so that the resin does not encapsulate said filler, while maintaining said mold at a temperature above the melting temperature of the resin;

cooling said mold while maintaining said load; and removing the molded structure thus produced from said mold.

2. A process for molding a structure as defined in claim 1, wherein the particle size of the filler powder is in the range of 10 to 150 microns.

3. A process for molding a structure as defined in claim 1, wherein the filler mixed with the resin is graphite.

4. A process for molding a fuel cell plate having improved thermal conductivity and electrical conductivity comprising:

mixing polyphenylene sulfide resin powder having a particle size of 25 to 170 microns with at least one filler powder selected from the group consisting of nickel, graphite, carbon, magnesium, aluminum, copper, tantalum, iron, titanium and silver having a particle size of 10 to 150 microns, the resin powder comprising about 15 percent of the mixture by weight;

precuring said polyphenylene sulfide resin by heating it to about 500° F. before or after mixing with said filler powder and holding at temperature for a sufficient period of time to provide a substantially uniform temperature distribution throughout the resin;

preheating a mold to a temperature of about 600° to 700° F.;

preheating a charge of the resin/filler mixture to a temperature of about 500° F.;

loading said preheated charge of resin/filler mixture into said preheated mold;

applying a load of about 3000 p.s.i. to said mold before said resin-filler mixture heats up to a temperature above the melting point of the resin in the preheated mold, so that the resin does not encapsulate said filler, while maintaining said mold at a temperature above 550° F.;

cooling said mold to about 400° to 500° F. or lower while maintaining full pressure; and removing the molded structure from the mold.

5. A process for molding a structure as defined in claim 4, wherein the filler mixed with the resin is graphite.

References Cited

UNITED STATES PATENTS

| | | | |
|---|---|---|---|
| 3,166,615 | 1/1965 | Farrell | 264—23 |
| 3,539,672 | 11/1970 | Valyi | 264—111 |
| 3,592,783 | 7/1971 | Edmonds | 260—37 R |
| 3,487,454 | 12/1969 | Oates et al. | 260—79.1 |
| 3,354,129 | 11/1967 | Edmonds et al. | 260—79 |
| 3,562,199 | 2/1971 | Hill et al. | 260—79.1 |

ROBERT F. WHITE, Primary Examiner

J. R. THURLOW, Assistant Examiner

U.S. Cl. X.R.

260—37 R, 79.1; 264—122, 126, 235, 331